Jan. 6, 1925.                                                         1,521,911
J. T. SKILLINS
COTTON CONDENSER
Filed Aug. 6, 1923

Inventor:
John T. Skillins
By S. W. Bates
Atty.

Patented Jan. 6, 1925.

1,521,911

UNITED STATES PATENT OFFICE.

JOHN T. SKILLINS, OF WESTBROOK, MAINE, ASSIGNOR TO DANA COTTON HARVESTER COMPANY, OF WESTBROOK, MAINE, A CORPORATION OF MAINE.

COTTON CONDENSER.

Application filed August 6, 1923. Serial No. 656,139.

*To all whom it may concern:*

Be it known that I, JOHN T. SKILLINS, a citizen of the United States, residing at Westbrook, in the county of Cumberland and State of Maine, have invented certain new and useful Improvements in Cotton Condensers, of which the following is a specification.

My invention relates to so called cotton condensers and it relates particularly to such condensers as applied to a cotton harvester, that may be used for other processes.

These cotton harvesters consist of a vacuum nozzle mounted on the end of a line of hose through which air is pulled by a vacuum blower or fan mounted on the harvesting machine.

The cotton is drawn through the nozzle passing through the hose and the blower and is discharged into a wire cage and drops into a bag, where it is collected.

It has been found by experience that an exceeding strong vacuum or suction is required to remove the cotton from its boll. When the blower or fan is speeded up high enough to get the high vacuum required and the cotton is made to pass through the fan itself, the seeds are liable to be broken by contact with the parts of the fan and an inferior quality of cotton is produced by the broken hulls of the seed being mixed in with the cotton fiber.

The purpose of my invention is to create the high vacuum required without subjecting the cotton to contact at very high velocity with the various solid parts of the fan. To accomplish this result I make use of a device acting upon the same principle as the well known cotton condenser which consists of a rotary screen within which a strong vacuum is created by a vacuum fan. The cotton is sucked onto the surface of the screen and rotated to a point where the vacuum is cut off so that the cotton may be easily removed.

In the present instance, I make use of an annular rotating screen upon the outer surface of which the cotton is drawn, the screen being then rotated to a point where the action of the vacuum is cut off and the cotton forced from the surface of the screen by compressed air blown from the inside.

The cotton thus comes in contact with only the wire of the screen and is blown therefrom passing into the receiving cage without coming in contact with any solid or swiftly moving parts which might have a tendency to break the seeds.

I have illustrated my invention by the accompanying drawing in which—

Figure 1:
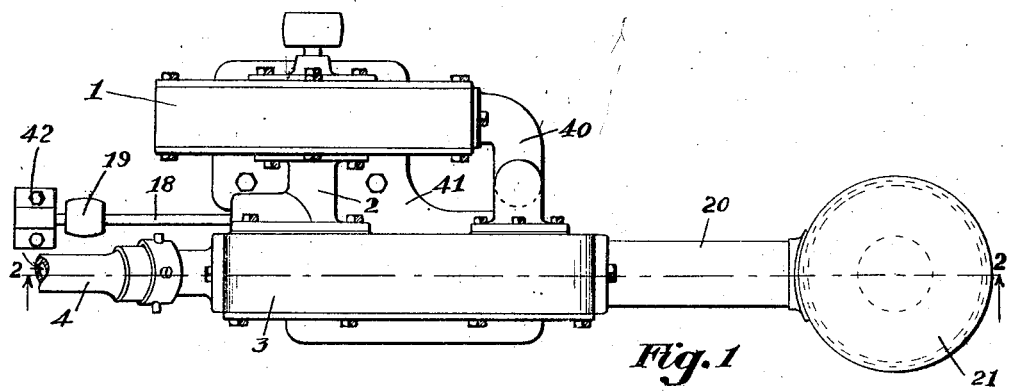
Figure 2:
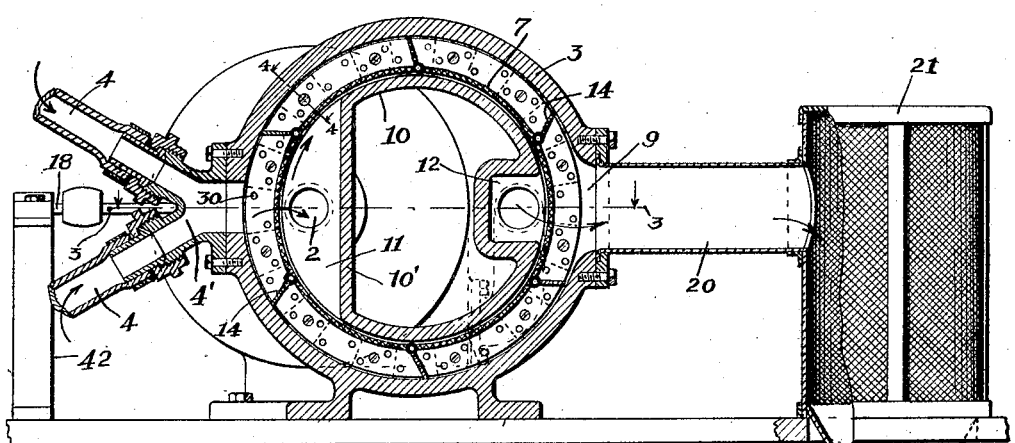
Figure 3:
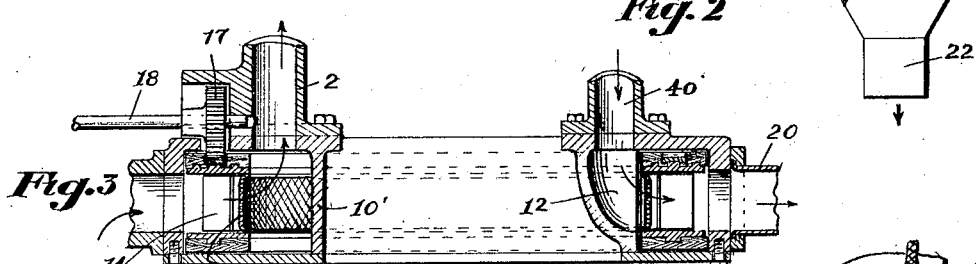
Figures 4, 5:
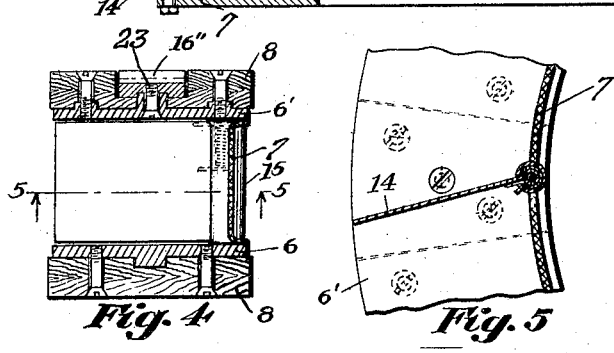
Figure 6:
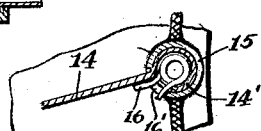

Fig. 1 is a plan of my device as used in a cotton harvester and in its preferable form, Fig. 2 is a section taken on the line 2—2 of Fig. 1, Fig. 3 is an enlarged section on the line 3—3 of Fig. 2, Fig. 4 is an enlarged section on the line 4—4 of Fig. 2, Fig. 5 is a section on the line 5—5 of Fig. 4 and Fig. 6 is an enlarged view of the pivoted end of the clapper valves shown in Fig. 5.

1 indicates the vacuum fan for producing a vacuum on the inside of the condenser and it is connected with the interior of the condenser by means of the duct 2. The condenser 3 is annular in form and the inlet 2 of the fan is securely bolted to the casing.

Cotton is drawn into the condenser through a line of hose 4 here shown as two in number, a Y connection 4' entering the casing at one side thereof.

The screening member is made up of a pair of annular plates 6 and 6' between which is inserted the short section of cylindrical screen 7. As here shown the edges of the screen are firmly brazed or attached by soldering to the inner edges of the two plates 6 and 6'.

The two plates and the screen thus form a "squirrel cage" or as I prefer to call it, a "screen cage" structure upon the surface of which the cotton drawn from the plants through the hose 4 is collected and from which it is discharged.

An annular space is formed in the casing within which the "screen cage" rotates. For the purpose of providing for the lateral bearings of the "screen cage" I secure to the outside surface of each of the annular plates 6 and 6' annular wood bearing plates 8 which are suitably treated with lubricating material to reduce as far as possible the friction between the inner surface of the casing and the screen cage.

At each side of the casing 3 is an opening. On the intake side is an opening for the Y connection 4' for admission of the cotton, already spoken of. On the opposite side of the casing is a similar opening 9 for the discharge of the cotton, On the inside of the casing is an incomplete center or hub 10 forming within the annular recesses, the space within which the screen cage rotates. On the inlet side of the casing the hub 10 is cut away by an upright section 10' forming the vacuum chamber 11 immediately inside the inlet side of the screen cage. On the opposite or outlet side of the casing there is formed by a recess in the hub 10, a pressure chamber 12. The chambers 11 and 12 are closed on their inner sides but are open on their outer sides against the screen which draws across the opening forming two chambers. The vacuum chamber 11 allows the cotton to be drawn onto the screen while the chamber 12, being filled with compressed air acts to blow the cotton off from the screen.

It is necessary that the vacuum after drawing the cotton onto the outer surface of the screen, should be cut off from certain sections of the screen in order to blow the cotton to be removed away from the screen from the other side of the casing.

For the purpose of intermittently cutting off the vacuum from the screen as here shown I divide the cage into 6 equal sections by clapper valves which divide the cage into separate chambers.

The clapper valves 14 are wide enough and long enough to fill the entire space between the rings 6 and 6'. The valves 14 are made of relatively thin material and at their inner ends they are bent to form incompletely closed cylinders 14'.

These cylinders 14' extend through sleeves 15 which reach across from one plate to the other, the sleeve 15 and the cylindrical ends 14' forming together a pivotal connection which gives the clapper valve itself a pivotal movement.

A spring 16 coiled inside of the cylindrical end 14' has two projecting ends which project out through a slot 16' formed in the sleeve 15.

The spring 16 is so adjusted and arranged that it tends to hold the valve at a slight angle with the radius.

The normal position of the valve is inclined slightly from the radial position so that the spring forces the outer end into close contact with the surface of the annular space within the casing making a practically air tight connection with the same. The sleeve 15 is fastened into position by being brazed at its two ends to the rings 6 and 6'.

The rotation of the screen cage is effected by means of an annular rack having teeth 16'' and held to the outside of the ring 6' by screws 23.

Engaging the teeth 16 is a pinion 17 mounted on the shaft 18 and operated by a pulley 19 and by the rotation of the pinion the cage is made to revolve.

By the rotation of the screen cage each of the sections formed by the clapper valve is brought first under the influence of the vacuum in the chamber 11 and later within the influence of the pressure chamber 12.

The cotton is discharged from the machine through a pipe or tube 20 connecting with the opening 9 and terminating in a receiving cage 21 from which it drops through a tube or opening 22 and is collected in a bag or other receptacle.

The operation of my condenser is as follows:

The vacuum pump being in operation and connected with the chamber 11, as described, produces a heavy vacuum within said chamber. The cotton is drawn through the Y connection 4' and is collected upon the screen section 30 which is then under the influence of the vacuum in the chamber 11.

As each of the chambers following the chamber 30 is brought within the influence of the vacuum of the chamber 11 cotton is collected in these chambers as they continually pass along.

When the chamber collecting the cotton passes beyond the vacuum chamber 11 it is cut off from the influence of the vacuum by the rearmost clapper valve of the chamber and the cotton remains in a neutral condition until the screen reaches the open face of the chamber 12.

When this point is reached the compressed air within said chamber going through the screen from the inside, forces the cotton away from the screen and into and through the tube or duct 20.

From the tube or duct 20 the cotton enters the open cage 21 and drops down through the outlet 22.

The compressed air for filling the chamber 12 is drawn, as here shown, through the duct 40 from the discharge end of the vacuum blower 1 so that the same blower which produces vacuum for the chamber 11 also produces compressed air for discharging the cotton from the screen after it has been collected thereon. The condenser proper and the vacuum blower are formed, as here shown, in a single casting 41 and a bearing post 42 supports one end of the shaft 18.

It will be seen that while the cotton is drawn into and through the hose 4 with a powerful suction there is no opportunity to rupture the seeds as the cotton is deposited upon the screen with no opportunity to strike hard surfaces where the seeds are liable to get broken and the blast of compressed air which releases the cotton from the screen may be and is generally much less powerful than the vacuum to which it is subjected at the other end of the machine.

With a condenser of this type a blower of relatively large diameter may be used producing a powerful vacum without excessive speed on the part of the engine and without any danger of breakage to the seeds due to the high velocities necessary for the cotton to move.

I claim:

1. In a cotton condenser for cotton harvesters, the combination of a pair of rotatable annular plates, an annular screen connecting said plate, a casing having an annular recess within which said screen rotates a vacuum chamber and a compressed air chamber each with an opening face over which said screen draws in its rotations, means for applying vacuum to said vacuum chamber and compressed air to said compressed air chamber whereby the cotton is first sucked on and subsequently blown from said screen.

2. In a cotton condenser for cotton harvesters, the combination of a pair of rotatable annular plates, an annular screen connecting said plates, a casing within which said screen rotates, a vacuum chamber for sucking cotton onto said screen and a compressed air chamber for expelling cotton outwardly from the surface of said screen, a series of partitions making tight joints between said screen and said casing forming a series of screen chambers.

3. In a cotton condenser for cotton harvesters, the combination of a pair of rotatable plates, an annular screen connecting said plates, a casing within which said screen rotates, a vacuum chamber within said screen for sucking cotton onto said screen, a compressed air chamber within said screen for expelling cotton outwardly from the surface of said screen and a series of spring pressed clapper valves pivoted to said screen and forming about said screen a series of air tight chambers.

4. In a cotton condenser for cotton harvesters the combination of a pair of rotatable annular plates, an annular screen connecting said plates, a casing formed outside of said screen and spaced parallel therefrom, a series of blades pivoted on the outside of said screen and extending across to said casing, the blades being slightly wider than the distance from the screen to the casing for making tight joints with the casing.

JOHN T. SKILLINS.